(12) United States Patent
Hsieh

(10) Patent No.: US 8,787,046 B2
(45) Date of Patent: Jul. 22, 2014

(54) SWITCH MODE POWER SUPPLY DEVICE

(75) Inventor: Wen-Cheng Hsieh, Taoyuan Hsien (TW)

(73) Assignee: Delta Electronics, Inc., Taoyuan Hsien (TW)

(*) Notice: Subject to any disclaimer, the term of this patent is extended or adjusted under 35 U.S.C. 154(b) by 0 days.

(21) Appl. No.: 13/349,390

(22) Filed: Jan. 12, 2012

(65) Prior Publication Data

US 2013/0083560 A1    Apr. 4, 2013

(30) Foreign Application Priority Data

Oct. 4, 2011 (TW) ............................. 100135817 A

(51) Int. Cl.
H02M 1/36 (2007.01)
H02M 3/335 (2006.01)

(52) U.S. Cl.
USPC ................... 363/49; 363/21.08; 363/21.16

(58) Field of Classification Search
USPC .............. 363/16, 18, 20, 21.01, 21.04, 21.06, 363/21.07, 21.08, 21.1, 21.11, 21.12, 21.14, 363/21.15, 21.16, 21.18, 35, 47, 48, 53, 89, 363/126, 127, 123, 49
See application file for complete search history.

(56) References Cited

U.S. PATENT DOCUMENTS

| | | | | | |
|---|---|---|---|---|---|
| 4,156,273 | A | * | 5/1979 | Sato | 363/21.16 |
| 5,852,550 | A | * | 12/1998 | Majid et al. | 363/21.05 |
| 5,978,235 | A | * | 11/1999 | Lampinen | 363/21.16 |
| 6,906,934 | B2 | * | 6/2005 | Yang et al. | 363/49 |
| 7,265,999 | B2 | * | 9/2007 | Murata et al. | 363/16 |
| 7,848,124 | B2 | * | 12/2010 | Choi et al. | 363/56.1 |
| 8,045,348 | B2 | * | 10/2011 | Zhu et al. | 363/49 |
| 8,059,429 | B2 | * | 11/2011 | Huynh | 363/18 |
| 2004/0012376 | A1 | * | 1/2004 | Taghizadeh-Kaschani | 323/282 |
| 2011/0228565 | A1 | * | 9/2011 | Griffin | 363/21.01 |

FOREIGN PATENT DOCUMENTS

TW    201027890 A    7/2010

* cited by examiner

*Primary Examiner* — Jessica Han
(74) *Attorney, Agent, or Firm* — Muncy, Geissler, Olds & Lowe, P.C.

(57) ABSTRACT

A power supply device including a rectifying unit, a supplying unit, a controlling unit, a conversion unit and a detection unit is disclosed. The rectifying unit processes an alternating current (AC) voltage to generate a direct current (DC) voltage. The supplying unit generates an operation voltage according to an input voltage. The controlling unit receives the operation voltage and generating an enabling signal. The conversion unit transforms the DC voltage to generate an auxiliary voltage according to the enabling signal. The auxiliary voltage is not equal to the operation voltage. The detection unit detects the auxiliary voltage. When the auxiliary voltage is generated, the detection unit de-activates the supplying unit to stop generating the operation voltage.

13 Claims, 6 Drawing Sheets

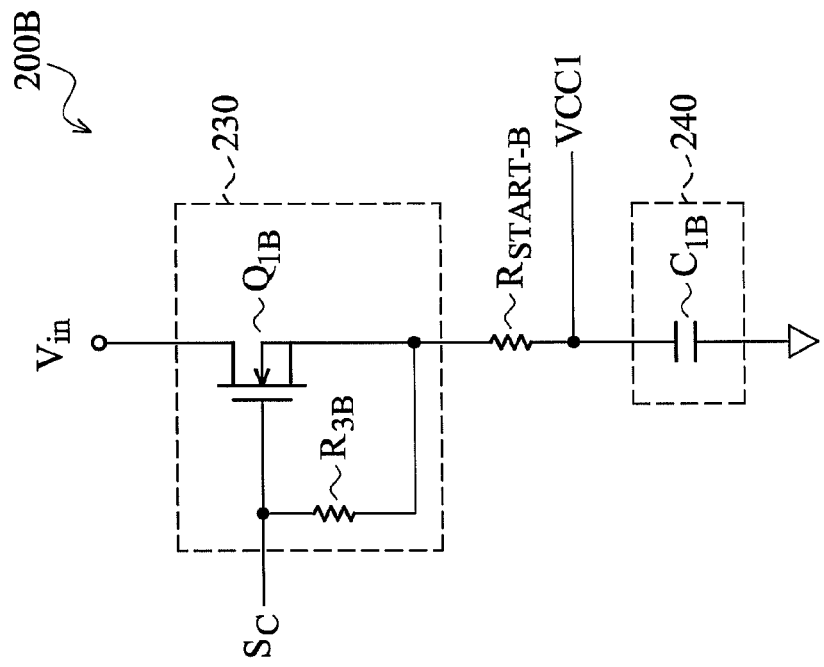
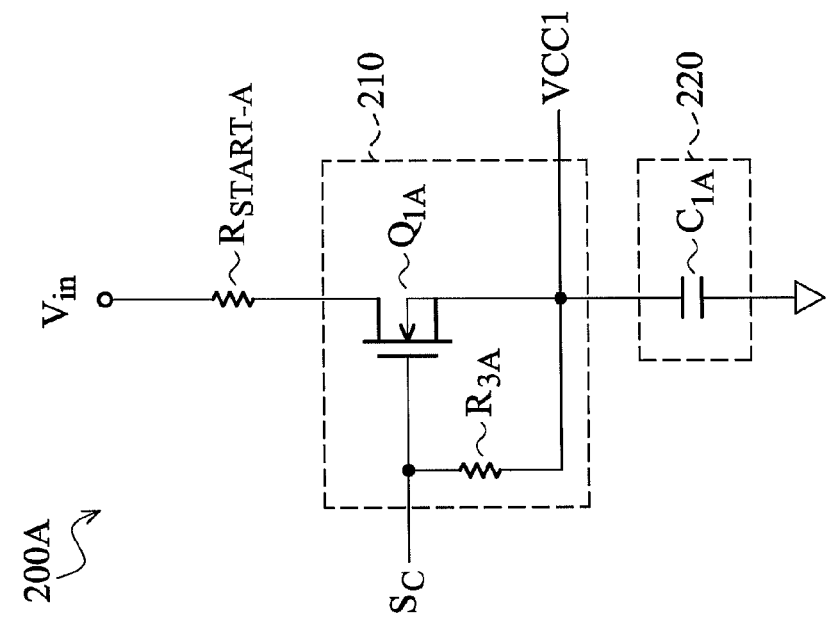
FIG. 2B
FIG. 2A

SWITCH MODE POWER SUPPLY DEVICE

CROSS REFERENCE TO RELATED APPLICATIONS

This application claims priority of Taiwan Patent Application No. 100135817, filed on Oct. 4, 2011, the entirety of which is incorporated by reference herein.

BACKGROUND OF THE INVENTION

1. Field of the Invention

The invention relates to a power supply device, and more particularly to a power supply device, which is capable of auto-cutting off a starting loop.

2. Description of the Related Art

Since internal elements of electronic products mostly utilize DC voltage, a power supply device is utilized to transform AC voltage into the DC voltage. When the internal elements of the electronic products receive the DC voltage, the internal elements can normally operate. Generally, power supply devices can be classified as a linear mode power supply device and a switch mode power supply device.

The linear mode power supply device receives and transforms an input voltage to generate an output voltage. Although the linear mode power supply has a simple circuit and high stability, the efficiency of the linear mode power supply is unacceptable when the difference between the input voltage and the output voltage is great. In such a case, the linear mode power supply cannot directly be disposed in the electronic products without cooperating with a switch mode power supply device. To the contrary, the switch mode power supply device has a small size and high transformation efficiency. Thus, the switch mode power supply device is critical to be applied in electronic products.

The switch mode power supply device generally comprises a control circuit. The control circuit receives energy via a start resistor and then executes a power conversion operation. After the control circuit is activated, the control circuit can receive energy via another loop. Thus, the control circuit is not required to receive energy via the start resistor. However, power consumption of the start resistor is still caused because some current continuously flows through the start resistor.

To reduce the power consumption caused by the start resistor, a conventional method is to increase resistance value of the start resistor, but it also increases the start time of the control circuit. However, refusing to increase the resistance value of the start resistor will cause more power consumption than start resistor with high resistance value.

BRIEF SUMMARY OF THE INVENTION

In accordance with an embodiment, a power supply device comprises a rectifying unit, a supplying unit, a controlling unit, a conversion unit and a detection unit. The rectifying unit processes an alternating current (AC) voltage to generate a direct current (DC) voltage. The supplying unit generates an operation voltage according to an input voltage. The controlling unit receives the operation voltage and generates an enabling signal to trigger the power supply device into an operation mode. The conversion unit transforms the DC voltage to generate an auxiliary voltage according to the enabling signal. The auxiliary voltage is not equal to the operation voltage. The detection unit detects the auxiliary voltage. If the auxiliary voltage is generated, the detection unit de-activates the supplying unit to stop generating the operation voltage. On the contrary, if no auxiliary voltage is generated, the supplying unit generates the operation voltage continuous.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein:

FIG. 2A~2E are schematic diagrams of other exemplary embodiments of the supplying unit.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
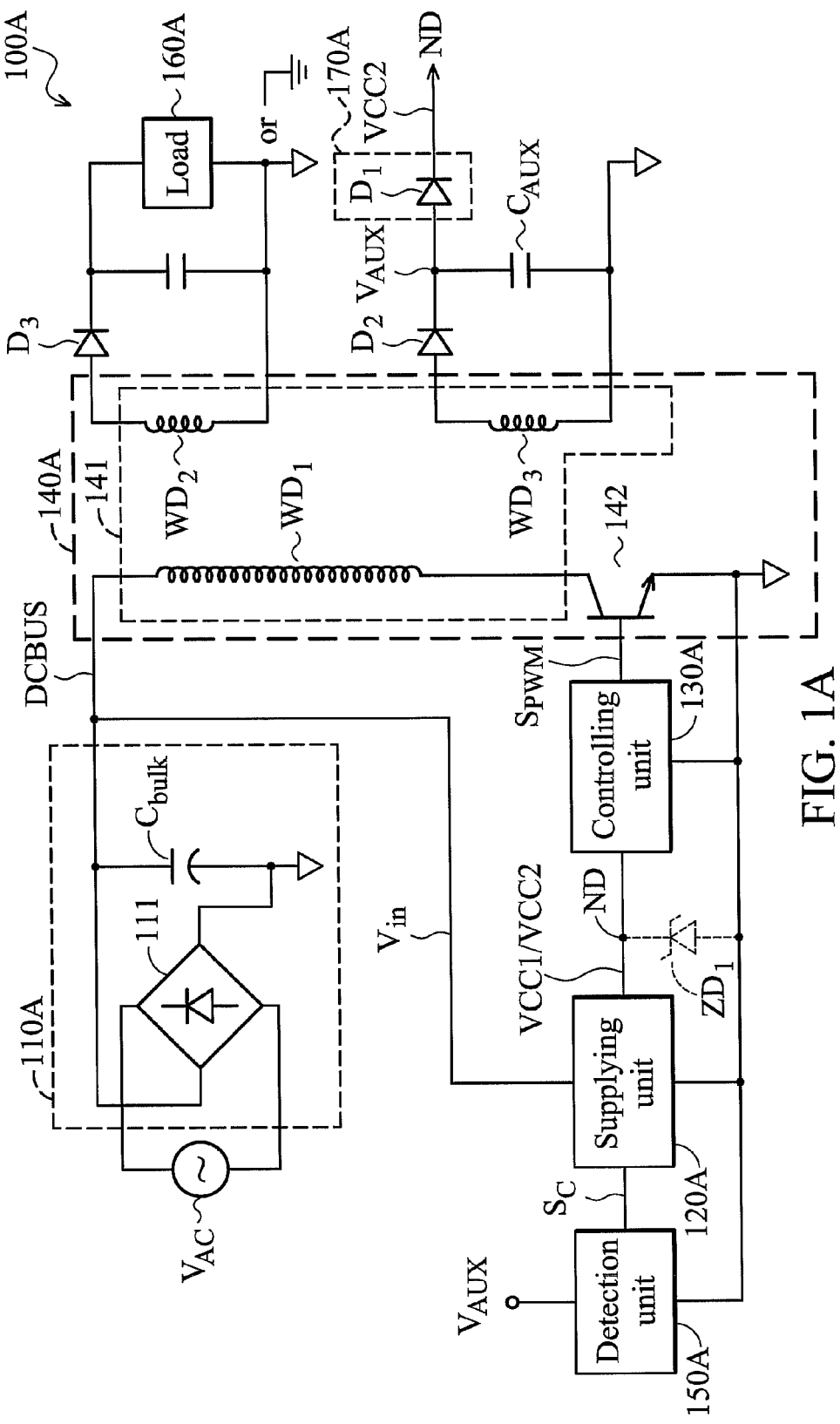
FIG. 1A is a schematic diagram of an exemplary embodiment of a power supply device.

FIG. 1A is a schematic diagram of an exemplary embodiment of a power supply device. In this embodiment, the power supply device 100A is a switch mode power supply (SMPS) device and comprises a rectifying unit 110A, a supplying unit 120A, a controlling unit 130A, a conversion unit 140A and a detection unit 150A.

During a start mode, the supplying unit 120A provides power (e.g. an operation voltage VCC1) to the controlling unit 130A, thus, the controlling unit 130A can normally generate an enabling signal $S_{PWM}$. The conversion unit 140A generates an auxiliary voltage $V_{AUX}$ according to the enabling signal $S_{PWM}$. Since an isolation unit 170A is coupled between the controlling unit 130A and the conversion unit 140A, the controlling unit 130A can receive an operation voltage VCC2 via the isolation unit 170A.

Since the operation voltage VCC2 can activate the controlling unit 130A to continuously generate the enabling signal $S_{PWM}$, the supplying unit 120A is not required to provide the operation voltage VCC1 to the controlling unit 130A. In this embodiment, a detection unit 150A is utilized to detect the auxiliary voltage $V_{AUX}$. When the auxiliary voltage $V_{AUX}$ is generated, it represents that the controlling unit 130A can normally operate. Thus, the power supply device 100A enters an operation mode. On the contrary, if the auxiliary voltage $V_{AUX}$ is not generated, it represents that the controlling unit 130A cannot normally operate. Thus, the supplying unit 120A continuously generates the operation voltage VCC1.

During the operation mode, the detection unit 150A generates a control signal $S_C$ to de-activate the supplying unit 120A to stop providing the operation voltage VCC1 to the controlling unit 130A. Since the supplying unit 120A is de-activated, no power consumption is generated by the supplying unit 120A. Furthermore, when the auxiliary voltage $V_{AUX}$ is stable, the control signal $S_C$ is output from the detection unit 150A immediately. Thus, it is ensured that the controlling unit 130A operates normally.

In this embodiment, when the controlling unit 130A does not enter the operation mode, the controlling unit 130A receives power via the supplying unit 120A continuously. Once the controlling unit 130A enters the operation mode, the controlling unit 130A receives power via the conversion unit 140A. Since the supplying unit 120A is not required to provide power to the controlling unit 130A during the operation mode, the supplying unit 120A is de-activated to cut the power consumption down.

As shown in FIG. 1A, the rectifying unit 110A receives and processes an alternating current (AC) voltage $V_{AC}$ to generate a direct current (DC) voltage and then transmits the DC voltage through a transmission line DCBUS. In this embodiment, the rectifying unit 110A comprises a bridge rectifier 111 and a capacitor $C_{bulk}$, but the disclosure is not limited thereto. In other embodiments, any circuit can serve as the rectifying unit 110A, as long as the circuit is capable of transforming AC voltage into DC voltage.

Figure 1B:
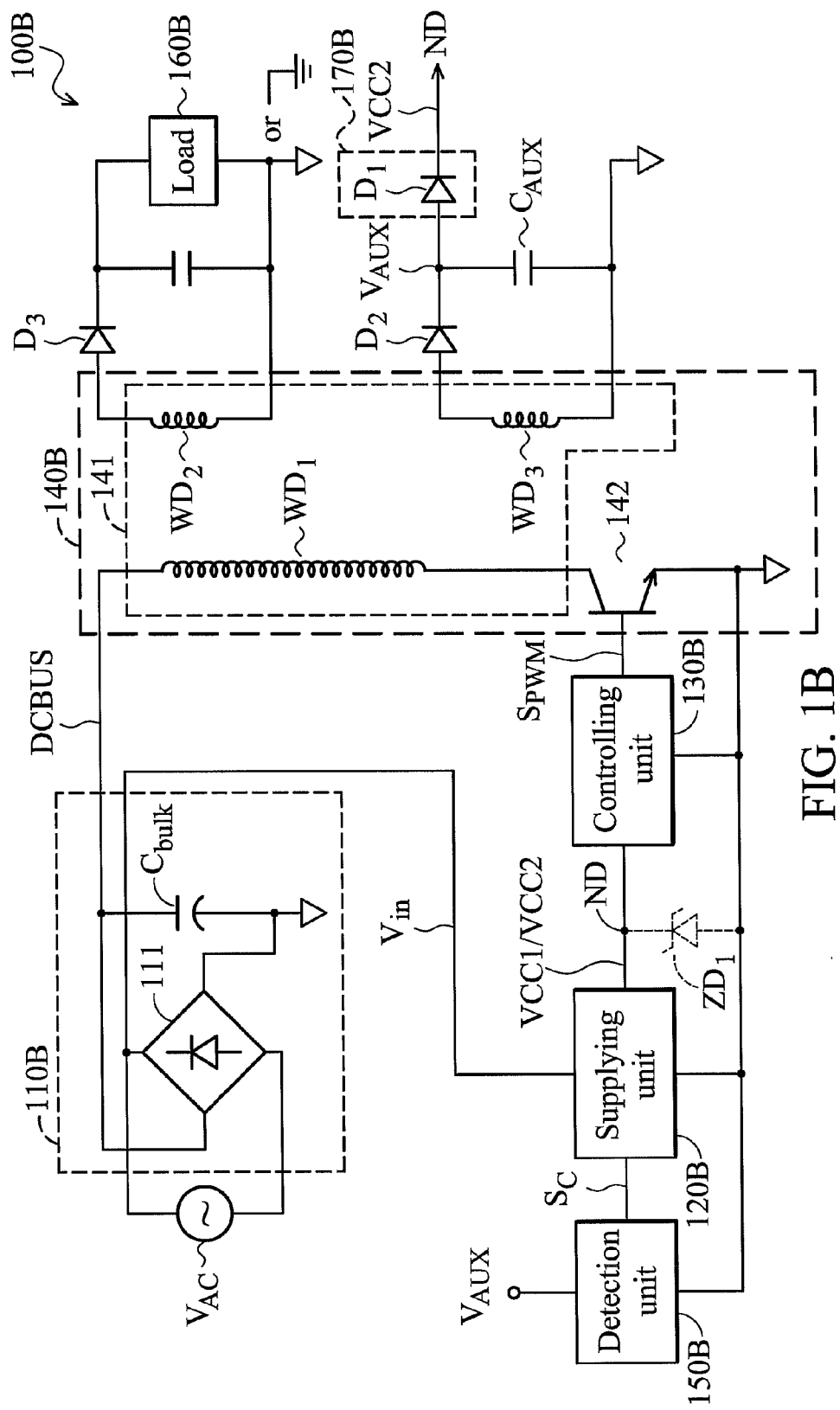
FIG. 1B is a schematic diagram of another exemplary embodiment of a power supply device.

The supplying unit 120A generates the operation voltage VCC1 to the node ND according to an input voltage $V_{in}$. In this embodiment, the input voltage $V_{in}$ is the DC voltage transmitted through the transmission line DCBUS, but the disclosure is not limited thereto. In other embodiments, the input voltage $V_{in}$ is the AC voltage $V_{AC}$ as shown in FIG. 1B.

During a start mode, the supplying unit 120A turns on a starting loop to provide power to the controlling unit 130A. During an operation mode (i.e. the controlling unit 130A can receive power from another loop), the supplying unit 120A turns off the starting loop according to the control signal $S_C$. Thus, the supplying unit 120A does not cause power consumption during the operation mode.

Timing of generating the enabling signal $S_{PWM}$ by the controlling unit 130 is according to the operation voltage VCC1. For example, when the level (i.e. the operation voltage VCC1) of the node ND arrives at a pre-determined value, the controlling unit 130A is activated to generate the enabling signal $S_{PWM}$. The invention does not limit the kind of the controlling unit 130A. In one embodiment, the controlling unit 130A outputs a pulse width modulation (PWM) signal.

The conversion unit 140A transforms the DC voltage transmitted by the transmission line DCBUS to generate the auxiliary voltage $V_{AUX}$ according to the enabling signal $S_{PWM}$. The enabling signal $S_{PWM}$ is not equal to the operation voltage VCC1. The invention does not limit the circuit structure of the conversion unit 140A. In this embodiment, the conversion unit 140A is a fly-back topology, but the disclosure is not limited thereto. In other embodiments, any circuit can serve as the conversion unit 140A, as long as the circuit comprises an auxiliary winding.

In this embodiment, the conversion unit 140A comprises a transformer 141 and a transistor 142. The transformer 141 comprises a primary winding $WD_1$, a secondary winding $WD_2$ and an auxiliary winding $WD_3$. When the enabling signal $S_{PWM}$ turns on the transistor 142, the primary winding $WD_1$ generates a response voltage according to the DC voltage transmitted by the transmission line DCBUS. When the enabling signal $S_{PWM}$ turns off the transistor 142, the response voltage is transmitted to the secondary winding $WD_2$ and the auxiliary winding $WD_3$. In one embodiment, the secondary winding $WD_2$ drives a load 160A according to the response voltage, and the auxiliary winding $WD_3$ generates the auxiliary voltage $V_{AUX}$ according to the response voltage. In this embodiment, the diode D3 coupled to the secondary winding $WD_2$ and the diode D2 coupled to the auxiliary winding $WD_3$ are utilized to limit current direction.

When the auxiliary winding $WD_3$ generates the auxiliary voltage $V_{AUX}$, the isolation unit 170A generates the operation voltage VCC2 according to the auxiliary voltage $V_{AUX}$. The isolation unit 170A is coupled to the controlling unit 130A to provide power (e.g. VCC2). Since the operation voltage VCC2 can activate the controlling unit 130A to continuously generate the enabling signal $S_{PWM}$, the supplying unit 120 is not required to generate the operation voltage VCC1 to the controlling unit 130A. Thus, after the controlling unit 130A normally operates, the supplying unit 120A is de-activated.

In this embodiment, the detection unit 150A is utilized to detect the auxiliary voltage $V_{AUX}$. After the auxiliary voltage $V_{AUX}$ is stable, the detection unit 150A generates a control signal $S_C$ to de-activate the supplying unit 120A such that the supplying unit 120A stops generating the operation voltage VCC1. Thus, the power consumption generated by the supplying unit 120A is reduced.

As shown in FIG. 1A, the isolation unit 170A is coupled between the conversion unit 140A and the controlling unit 130A. Thus, the auxiliary voltage $V_{AUX}$ is not equal to the operation voltage VCC1 or VCC2. In this embodiment, the isolation unit 170A is a diode $D_1$. The diode $D_1$ comprises an anode receiving the auxiliary voltage $V_{AUX}$ and a cathode generating the operation voltage VCC2 to the controlling unit 130A.

The isolation unit 170A is utilized to isolate the auxiliary voltage $V_{AUX}$ and the operation voltage VCC2. When the auxiliary voltage $V_{AUX}$ is generated, the isolation unit 170A generates the operation voltage VCC2 according to the auxiliary voltage $V_{AUX}$. Thus, any circuit or element can serve as the isolation unit 170A, as long as the circuit or element is capable of accomplishing the above function.

In FIG. 1A, the power supply device 100A further comprises a diode $ZD_1$. In this embodiment, the diode $ZD_1$ is utilized to clamp voltage to protect the controlling unit 130A. Additionally, the capacitors $C_{AUX}$ and $C_{bulk}$ can store energy.

FIG. 1B is a schematic diagram of another exemplary embodiment of a power supply device. FIG. 1B is similar to FIG. 1A with the exception that the supplying unit 120B shown in FIG. 1B receives the input voltage $V_{in}$ which is also the AC voltage $V_{AC}$ received by the rectifying unit 110B.

FIG. 2A~2E are schematic diagrams of exemplary embodiments of the supplying unit. The invention does not limit the circuit structure of the supplying unit. Any circuit can serve as the supplying unit, as long as the circuit is capable of providing an operation voltage and stopping the provision of the operation voltage according to a control signal.

As shown in FIG. 2A, the supplying unit 200A comprises a start resistor $R_{START-A}$, a turn-on module 210 and a storage module 220. The turn-on module 210 is connected to the start resistor $R_{START-A}$ in series. The storage module 220 is connected to the turn-on module 210 in series.

During a start mode, the turn-on module 210 is turned on to transmit the energy of input voltage $V_{in}$ into the storage module 220. In this embodiment, the storage module 220 is a capacitor $C_{1A}$ and stores the energy of the input voltage $V_{in}$ when the turn-on module 210 is turned on. The stored energy is transformed as the operation voltage VCC1.

During an operation mode (i.e. the auxiliary voltage $V_{AUX}$ is generated), the control signal $S_C$ de-activates the turn-on module 210 to stop transmission energy of the input voltage $V_{in}$ to the storage module 220. Since the turn-on module 210 is turned off, no current flows through the start resistor $R_{START-A}$. Thus, the start resistor $R_{START-A}$ does not cause power consumption. Furthermore, since the start resistor $R_{START-A}$ does not cause power consumption, the resistance value of the start resistor $R_{START-A}$ can be minimum to increase the start speed of the controlling unit 130A or 130B.

In this embodiment, the turn-on module 210 comprises a depletion-mode metal oxide semiconductor field effect transistor (MOSFET) $Q_{1A}$ and a turn-on resistor $R_{3A}$, but the disclosure is not limited thereto. Any circuit can serve as the turn-on module 210, as long as the circuit is capable of turning on during a start mode and is capable of turning off during an operation mode.

The depletion-mode MOSFET $Q_{1A}$ comprises a control terminal, a first electrode and a second electrode. The first electrode is coupled to one terminal of the start resistor $R_{START-A}$. Another terminal of the start resistor $R_{START-A}$ receives the input voltage $V_{in}$. The turn-on resistor $R_{3A}$ is coupled between the control terminal and the second electrode of the depletion-mode MOSFET $Q_{1A}$.

For example, during a start mode, the control signal $S_C$ is not generated. Since no current flows through the turn-on resistor $R_{3A}$ coupled between the control terminal and the second electrode, the depletion-mode MOSFET $Q_{1A}$ is turned on. Thus, the storage module 220 can store energy according to the input voltage $V_{in}$ such that the operation voltage VCC1 is generated.

During an operation mode, the control signal $S_C$ de-activates the depletion-mode MOSFET $Q_{1A}$. Thus, the depletion-mode MOSFET $Q_{1A}$ is turned off such that no current flows through the start resistor $R_{START-A}$ and no power consumption is caused by the start resistor $R_{START-A}$.

In FIG. 2B, the start resistor $R_{START-B}$ is coupled between the turn-on module 230 and the storage module 240. As shown in FIG. 2B, the turn-on module 230 comprises a depletion-mode MOSFET $Q_{1B}$ and a turn-on resistor $R_{3B}$.

The depletion-mode MOSFET $Q_{1B}$ comprises a control terminal receiving the control signal $S_C$, a first electrode receiving the input voltage $V_{in}$ and a second electrode coupled to one terminal of the start resistor $R_{START-B}$. Another terminal of the start resistor $R_{START-B}$ is coupled to the storage module 240. In this embodiment, the storage module 240 is a capacitor $C_{1B}$.

Figure 2D:
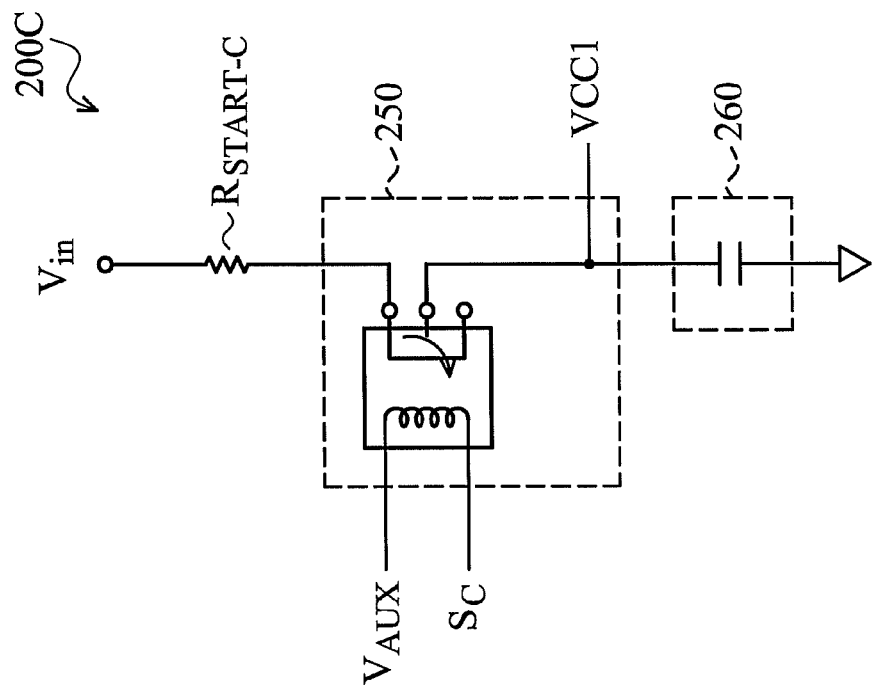
Figure 2C:
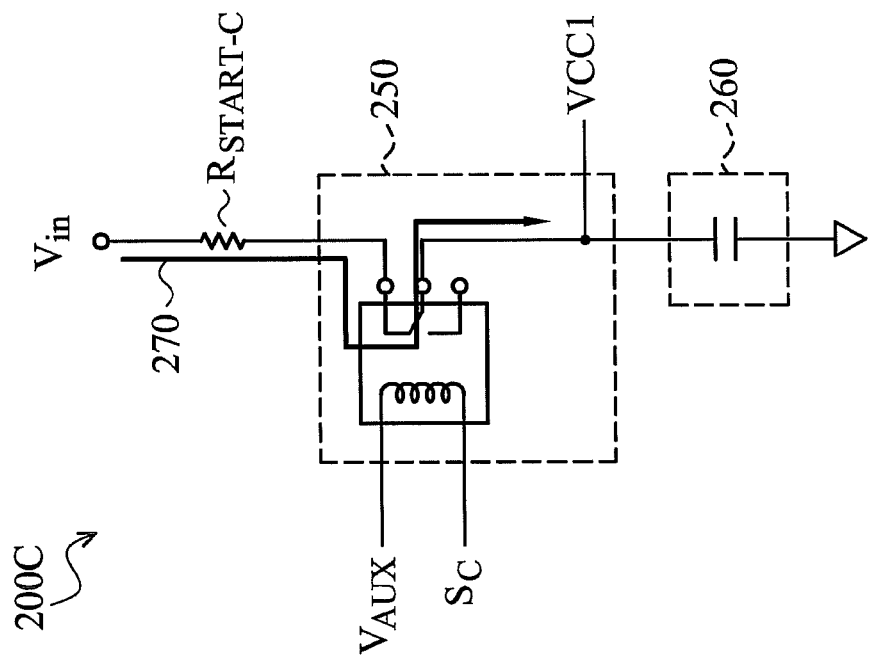

FIGS. 2C and 2D are similar to FIG. 2A with the exception that the turn-on module 250 of FIG. 2C or 2D comprises a relay. As shown in FIG. 2C, during a start mode, the control signal $S_C$ and the auxiliary voltage $V_{AUX}$ are not generated. Thus, the turn-on module 250 provides a supply loop 270. The supply loop 270 transmits energy and the storage module 260 stores the energy to generate the operation voltage VCC1. In other embodiments, any relay with a normal-close property can be applied in the turn-on module 250.

Refer to FIG. 2D, during an operation mode, the auxiliary voltage $V_{AUX}$ and the control signal $S_C$ are generated to drive the turn-on module 250 active and make the relay cut off the supply loop 270. Since no current can flow through the start resistor $R_{START-C}$, the start resistor $R_{START-C}$ does not cause power consumption.

Figure 2E:
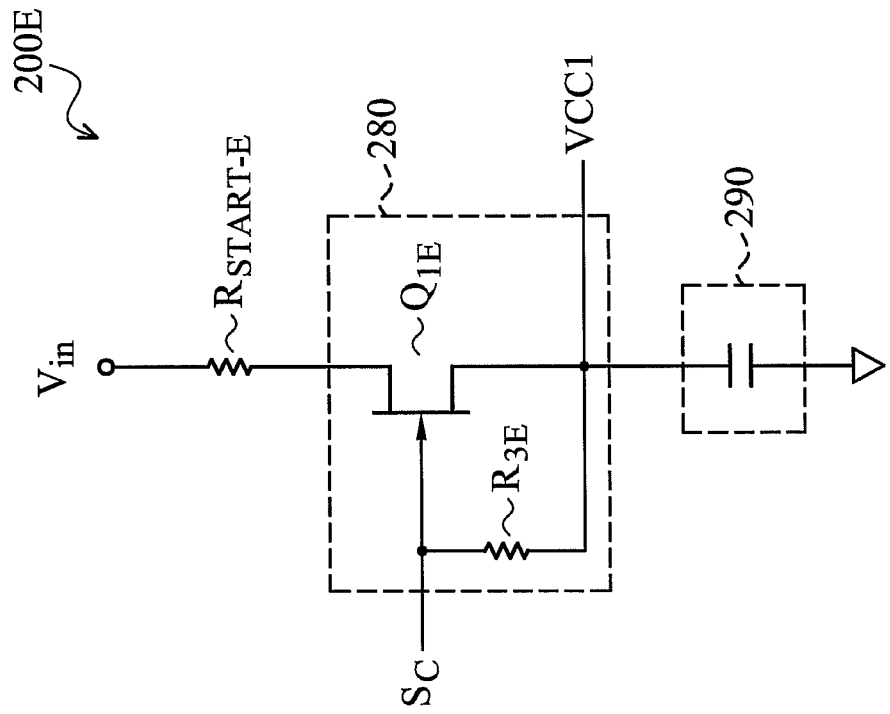

FIG. 2E is similar to FIG. 2A with the exception that the turn-on module 280 in FIG. 2E comprises a junction field effect transistor (JFET) $Q_{1E}$. In other embodiments, any element with a normally-on property can be applied in the turn-on module 280.

Figure 3:
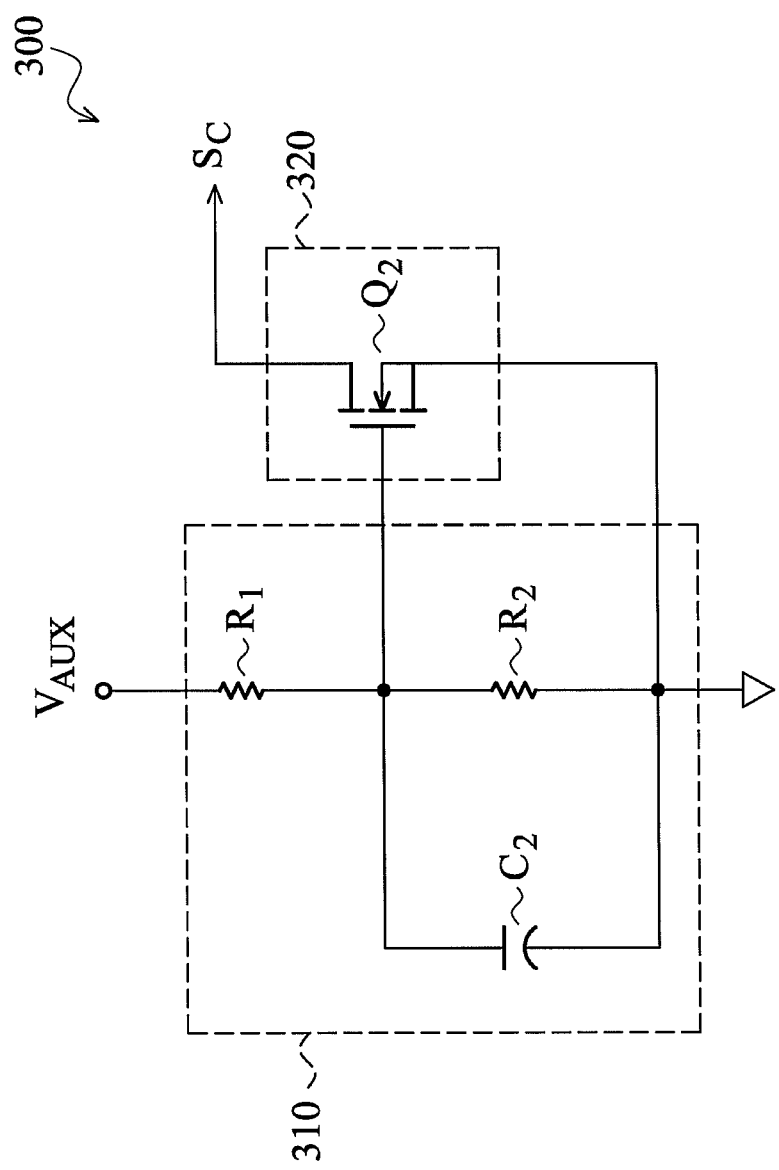
FIG. 3 is a schematic diagram of an exemplary embodiment of the detection unit.

FIG. 3 is a schematic diagram of an exemplary embodiment of the detection unit, but the disclosure is not limited thereto. In other embodiments, any circuit can serve as the detection unit 150A or 150B, as long as the circuit is capable of detecting voltage and is capable of generating a control signal according to the detection result.

In this embodiment, the detection unit 300 comprises a voltage divider 310 and a switching module 320. The voltage divider 310 processes the auxiliary voltage $V_{AUX}$. As shown in FIG. 3, the voltage divider 310 comprises resistors $R_1$, $R_2$ and a capacitor $C_2$. The resistor $R_1$ is serially connected to the resistor $R_2$ between the auxiliary voltage $V_{AUX}$ and a ground voltage. The capacitor $C_2$ is connected to the resistor $R_2$ in parallel.

The switching module 320 generates the control signal $S_C$ according to the processing result of the voltage divider 310. In this embodiment, the switching module 320 is a transistor $Q_2$. The transistor $Q_2$ comprises a gate coupled to the resistor $R_2$, a drain outputting the control signal $S_C$ and a source receiving the ground voltage. When the auxiliary voltage $V_{AUX}$ arrives at a pre-determined value, the processing result of the voltage divider 310 can turn on the transistor $Q_2$ to output the control signal $S_C$ with a low level.

However, the control signal $S_C$ with a low level does not limit the invention. In other embodiments, the control signal $S_C$ relates to the kinds of the turn-on modules 210 and 230 of the supplying units 120A and 120B. For example, if the turn-on module 210 comprises an N-channel transistor, the detection unit 300 generates a control signal $S_C$ with a low level to turn off the N-channel transistor. Contrarily, if the turn-on module 210 comprises a P-channel transistor, the detection unit 300 generates a control signal $S_C$ with a high level to turn off the P-channel transistor.

According to the above description, during a start mode, a controlling unit can receives a first operation voltage VCC1 via a starting loop (e.g. the supplying unit) such that a conversion unit is activated to generate an auxiliary voltage. After the auxiliary voltage is generated, the controlling unit receives a second operation voltage VCC2 via another loop, which provides the auxiliary voltage. Thus, after the auxiliary voltage is generated, the starting loop is turned off to avoid causing power consumption.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power supply device, comprising:
    a rectifying unit processing an alternating current (AC) voltage to generate a direct current (DC) voltage;
    a supplying unit generating an operation voltage according to an input voltage;
    a controlling unit receiving the operation voltage and generating an enabling signal;
    a conversion unit transforming the DC voltage to generate an auxiliary voltage according to the enabling signal, wherein the auxiliary voltage is not equal to the operation voltage; and
    a detection unit for detecting the auxiliary voltage, wherein when the auxiliary voltage is generated, the detection unit de-activates the supplying unit to stop generating the operation voltage.

2. The power supply device as claimed in claim 1, wherein the input voltage is the AC voltage or the DC voltage.

3. The power supply device as claimed in claim 1, wherein the supplying unit comprises:
    a start resistor;

a turn-on module connected to the start resistor in series; and a storage module connected to the turn-on module in series and storing energy according to the input voltage, wherein the energy stored in the storage module is transformed as the operation voltage.

4. The power supply device as claimed in claim 3, wherein during a start mode, the turn-on module is activated to transmit the input voltage to the storage module and during an operation mode, the detection unit de-activates the turn-on module to stop transmitting the input voltage to the storage module.

5. The power supply device as claimed in claim 4, wherein the turn-on module comprises a relay or a junction field effect transistor (JFET).

6. The power supply device as claimed in claim 3, wherein the turn-on module comprises:
a depletion-mode metal oxide semiconductor field effect transistor (MOSFET) comprising a control terminal, a first electrode and a second electrode; and
a turn-on resistor coupled between the control terminal and the second electrode.

7. The power supply device as claimed in claim 6, wherein the first electrode is coupled to a first terminal of the start resistor, and a second terminal of the start resistor receives the input voltage.

8. The power supply device as claimed in claim 6, wherein the first electrode receives the input voltage, the second electrode is coupled to a first terminal of the start resistor, and a second terminal of the start resistor is coupled to the storage module.

9. The power supply device as claimed in claim 1, further comprising:
an isolation unit coupled between the conversion unit and the controlling unit.

10. The power supply device as claimed in claim 9, wherein the isolation unit is a diode comprising an anode receiving the auxiliary voltage and a cathode coupled to the controlling unit.

11. The power supply device as claimed in claim 1, wherein the detection unit comprises:
a voltage divider processing the auxiliary voltage; and
a switching module generating a control signal to de-activate the supplying unit according to a processing result of the voltage divider.

12. The power supply device as claimed in claim 11, wherein the voltage divider comprises:
a first resistor;
a second resistor connected to the first resistor in series between the auxiliary voltage and a ground voltage; and
a capacitor connected to the second resistor in parallel.

13. The power supply device as claimed in claim 12, wherein the switching module is a transistor, and the transistor comprises a gate coupled to the second resistor, a drain outputting the control signal and a source receiving the ground voltage.

* * * * *